May 16, 1961 H. V. GASKILL 2,984,077
METHOD OF USING THE PELTIER EFFECT FOR COOLING EQUIPMENT
Filed Oct. 24, 1958
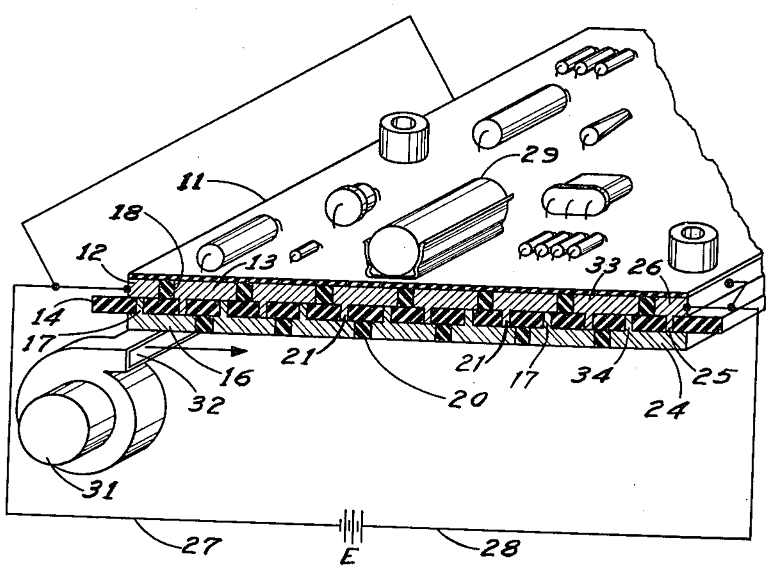
INVENTOR.
HAROLD V. GASKILL
BY [signature]
ATTORNEY 2,984,077

METHOD OF USING THE PELTIER EFFECT FOR COOLING EQUIPMENT

Harold V. Gaskill, Cedar Rapids, Iowa, assignor to Collins Radio Company, Cedar Rapids, Iowa, a corporation of Iowa Filed Oct. 24, 1958, Ser. No. 769,370

5 Claims. (Cl. 62—3)

This invention relates in general to apparatus for cooling electronic equipment.

Electronic equipments are being designed to fit into small volumes, and it is necessary to dispose of the heat generated in the equipment.

It is an object of this invention to provide a cooling system for electronic equipment which utilizes the Peltier effect.

Another object of this invention is to provide a simple and efficient method of cooling electronic apparatus.

A feature of this invention is found in the provision for a sheet of insulating material on which components to be cooled are mounted, and which is attached to a Peltier cooling assembly comprising dissimilar metals through which a current is passed so as to cool the insulating sheet. The junctions between the dissimilar metals are formed by relatively narrow strips so that minimum heat flow will occur between the hot and cold junctions.

Further objects, features, and advantages of this invention will become apparent from the following description and claims when read in view of the drawing, in which:

The figure illustrates the composite plate constructed according to this invention upon which components are mounted.

The figure shows a thin sheet of electrical insulating material 11, as for example plastic, upon which are mounted a plurality of electrical components 29. The components 29 are in intimate heat flow contact with the plate 11 so that heat generated may flow into the plate 11.

Bonded to the plate 11 are a plurality of strips 12 of a first suitable thermoelectric material which are insulated from each other by insulating strips 18. Thermoelectric strips of a second material are designated 16 and are separated from the strips 12 by insulating material 14, and from each other by insulating strips 20. Projections 17 are attached to the thermoelectric material 16 and extend through the insulating material 14 and into engagement with the strips 12. Likewise, projections 21 are connected to the strips 13 and extend through the insulating material 14 into engagement with the strips 16.

The contacts between material 12 and projections 17 are cold junctions, and the contacts between the projections 21 and the strips 16 are hot junctions.

A source of current is furnished by battery E which has a first lead 27 that connects to a strip 12 at one side of the plate and a second lead 28 that connects to the last strip 26 at the other side of the plate. Current will flow from the battery E through the lead 28 into the strip 26, then across the projection 25 and through the junction between the extension 25 and the strip 24, then through the projection 34 to the strip 33 and so forth to the first strip 12. Current will then pass through the lead 27 back to the battery E. The leads 27 and 28 may be connected to the strips 12 and 26, respectively, at a number of points so that the current flows uniformly from right to left relative to the figure.

A blower 31 has an outlet 32 which blows cooling air past the strips 16 which are heated by the Peltier effect.

The strips 12 may be made of a suitable material, as for example bismuth telluride, $Bi_2Te_3$, and the strips 16 may be made of bismuth. The junctions between the projections 17 and the strips 12 are cold junctions which would tend to cool insulating plate 11 and thus remove heat from components 29. The relatively small cross sections of projections 17 and 21 minimize direct heat flow from the hot to the cold junctions so as to increase the efficiency of the apparatus.

It is seen that this invention provides means for cooling electronic components, and although it has been described with respect to a particular embodiment, it is not to be so limited, as changes and modifications may be made which are within the full intended scope of the invention as defined by the appended claims.

What is claimed is:

1. Apparatus for cooling, comprising a plurality of strips of a first thermoelectric material, a plurality of strips of a second thermoelectric material, first insulating material between the plurality of strips of the first thermoelectric material, second insulating material between the plurality of strips of the second thermoelectric material, first projections extending from the first plurality of thermoelectric strips and in engagement with the second plurality of strips, and second projections extending from the second plurality of strips and in engagement with the first plurality of strips.

2. Means for cooling, utilizing the Peltier effect, comprising a first plurality of strips of a first thermoelectric material insulatingly mounted adjacent each other and formed with first projections which extend outwardly therefrom, a second plurality of thermoelectric strips insulatingly mounted adjacent each other and formed with second projections which extend into engagement with the first plurality of thermoelectric strips, first projections of the first thermoelectric strips in engagement with the second thermoelectric strips, and a current source connected to the first and last of said first plurality of thermoelectric strips.

3. Means for cooling, utilizing the Peltier effect, comprising a first plurality of strips of a first thermoelectric material insulatingly mounted adjacent each other and formed with first projections which extend outwardly thereform, a second plurality of thermoelectric strips insulatingly mounted adjacent each other and formed with second projections which extend into engagement with the first plurality of thermoelectric strips, the first projections from the first thermoelectric strips in engagement with the second thermoelectric strips, a current source connected to the first and last of said first plurality of thermoelectric strips, and insulating material mounted between the first and second plurality of thermoelectric strips.

4. Means for cooling, utilizing the Peltier effect, comprising a first plurality of strips of a first thermoelectric material insulatingly mounted adjacent each other and formed with first projections which extend outwardly therefrom, a second plurality of thermoelectric strips insulatingly mounted adjacent each other and formed with second projections which extend into engagement with the first plurality of thermoelectric strips, first projections from the first thermoelectric strips in engagement with the second thermoelectric strips, a current source connected to the first and last of said first plurality of thermoelectric strips, and a plate of insulating material connected to the first plurality of thermoelectric strips and a plurality of articles to be cooled mounted thereon.

5. Means for cooling, utilizing the Peltier effect, comprising a first plurality of strips of a first thermoelectric material insulatingly mounted adjacent each other and formed with first projections which extend outwardly therefrom, a second plurality of thermoelectric strips insulatingly mounted adjacent each other and formed with second projections which extend into engagement with the first plurality of thermoelectric strips, the first projections from the first thermoelectric strips in engagement with the second thermoelectric strips, a current source connected to the first and last of said first plurality of thermoelectric strips, a plate of insulating material connected to the first plurality of thermoelectric strips and a plurality of articles to be cooled mounted thereon, and blower means mounted adjacent the second plurality of thermoelectric strips to remove heat therefrom.

References Cited in the file of this patent

UNITED STATES PATENTS

| | | |
|---|---|---|
| 413,136 | Dewey | Oct. 15, 1889 |
| 1,818,437 | Stuart | Aug. 11, 1931 |
| 2,777,975 | Aigran | Jan. 15, 1957 |
| 2,844,638 | Lindenblad | July 22, 1958 |